United States Patent Office 3,398,172
Patented Aug. 20, 1968

3,398,172
ORGANOSILOXANE-POLYETHER
URETHANE EMULSIFIERS
Klaus Damm, Cologne-Flittard, and Horst Steinbach and Walter Noll, Leverkusen, Germany, assignors to Farbenfabriken Bayer Aktiengesellschaft, Leverkusen, Germany, a German corporation
No Drawing. Filed June 8, 1964, Ser. No. 373,558
8 Claims. (Cl. 260—448.2)

ABSTRACT OF THE DISCLOSURE

Emulsifiers are prepared by reacting polyether siloxanes with polyfunctional isocyanates and emulsions are prepared from said emulsifier, water and an organopolysiloxane.

---

The invention concerns aqueous emulsions of liquid organopolysiloxanes and of solutions of resinous solid organopolysiloxanes with certain new emulsifiers.

It is well known in the art to use aqueous organopolysiloxane emulsions for various purposes, e.g. as mold release agents, foam preventing additives and materials for hydrophobing and other impregnating processes. It is likewise well known that the preparation of such emulsions in a sufficiently stable state encounters difficulties, and the greater the molecular weight of the organopolysiloxanes, the greater the difficulties encountered, especially when the molecular weight is above 60,000.

It is therefore an object of this invention to provide novel stable aqueous emulsions of liquid organopolysiloxanes.

Another object of this invention is to provide a process for the preparation of aqueous organopolysiloxane emulsions in which the emulsifier is the reaction product of a polyether siloxane which contains COH groups and a polyfunctional isocyanate.

A further object of this invention is to provide stable aqueous emulsions of high molecular weight oils.

These and other objects are accomplished in accordance with this invention, generally, by reacting a polyether siloxane containing COH groups with a polyfunctional isocyanate.

According to this invention it is possible to obtain stable emulsions of high molecular weight oils whereby the reaction components may be stirred by hand or with a simple stirring mechanism instead of the complex emulsifier apparatus usually required.

The polyether siloxanes useful in this invention must be free from Si—O—C-linkages in order to be stable to hydrolysis. Therefore, the polyether radicals are directly linked to the siloxane radicals by Si—C-linkages. These polyether siloxanes are obtained by known methods in which, for example a methyl hydrogen siloxane is first added to an olefinic epoxide and the epoxyorganosiloxane thereby obtained is in turn added to a polyglycol monoalkyl ether according to the mechanism

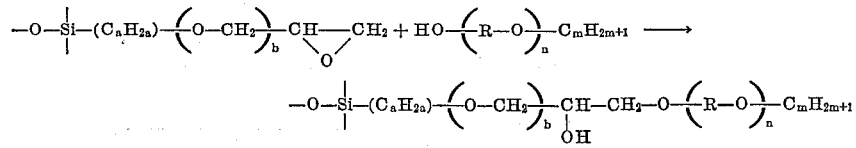

Wherein $a$ and $m$ are numbers from 1 to 4, preferably $a=3$ and $m=4$; $b$ is 0–1; and $-(R-O)_n$ is a polyalkylene oxide- or -arylene oxide chain. The content of epoxide groups

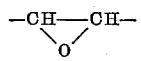

of molecular weight 42 in the epoxyorganosiloxane should be greater than 1% by weight in order to ensure the emulsifying action of the end product. At the most, one epoxidised radical is bound to each silicon atom.

The siloxane units with which the polyether radicals are linked may be mono-, di- or tri-functional. Difunctional units with a methyl radical are preferred. The remaining siloxane units of the polyether siloxane are the known hydrocarbon-substituted units of the general formula $R'_c SiO_{4-c/2}$, wherein each $R'$ is methyl or phenyl and $c=1$, 2 or 3. Preferably, $c=2$ and the terminal members of the resulting chains are preferably $O_{1/2}$—$SiR'_3$ or

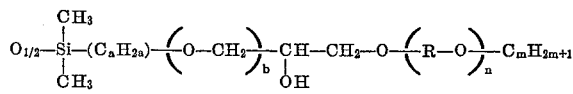

The polyglycol monoalkyl ethers

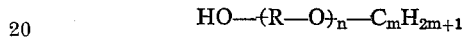

are polymers of molecular weight between 100 and several million, preferably below 10,000, and may be obtained in known manner from ethylene oxide or propylene oxide or by co-polymerisation of ethylene oxide with propylene oxide, 1:2 epoxybutane, isobutylene oxide, tetrahydrofuran or also with compounds of the aromatic series such as styrene oxide. Copolymers of ethylene oxide and one or more other alkylene oxides at least one of which contains an olefinic double bond, such as methacrylic acid glycidic ester, allyl glycidic ether or butadiene monoxide may also be used. Polymers of ethylene oxide or propylene oxide and copolymers of ethylene oxide and propylene oxide have also been found to be especially suitable.

The addition of polyglycol monoalkyl ethers to epoxy-organosiloxanes generally is carried out at temperatures between 40 and 150° C., and may be, if desired, in hydrocarbon solution. Boron trifluorides or potassium hydroxide in quantities of 0.1% of the weight of polyglycol ether may be added as catalyst.

The polyethersiloxanes containing COH groups and stable to hydrolysis obtained as described above are reacted with polyfunctional isocyanates, preferably di- or tri-isocyanates, at temperatures between 20 and 100° C., the progress of the reaction being marked by a thickening of the reaction mixture. At least sufficient isocyanate to provide one isocyanate group for every second OH group of polyether siloxane is used, but an excess of isocyanate is preferred and has not been found to interfere with the reaction. Generally, all aliphatic and aromatic polyfunctional isocyanates are suitable for this purpose but for example hexamethylene diisocyanate, toluylene diisocyanate, di-(4-isocyanate-phenyl)-methane, di-(4-isocyanatephenyl)-dimethylmethane, dicyclohexyl diisocyanate and tri-(4-isocyanatephenyl)-thionophosphate have been found particularly suitable.

Further, any suitable organic polyisocyanate may be used in the preparation of the organosiloxane emulsifier. The following are specific examples of such suitable organic isocyanates and although only the isocyanates are listed, it is to be understood that the corresponding isothiocyanates are meant to be included and are within the contemplated scope of this invention.

Examples of suitable organic diisocyanates which may be used either alone or in admixture are aliphatic, aromatic, or heterocyclic diisocyanates such as tetramethylene diisocyanate, hexamethylene diisocyanate, decamethylene diisocyanate, cyclohexane-1,4-diisocyanate, dicyclohexylmethane - 4,4' - diisocyanate, meta - xylylene diisocyanate, naphthalene-1,5-diisocyanate, para-xylylene diisocyanate, meta-phenylene diisocyanate, para-phenylene diisocyanate, diphenyl dimethyl methane-4,4'-diisocyanate - 3,3' - dimethoxy diphenylmethane-4,4'-diisocyanate, 1,3-diisocyanato cyclobutane and the like. The following are examples of poly-isocyanates whose —NCO groups differ in their reactivity: toluylene-2,4-diisocyanate, toluylene - 2,6 - diisocyanate, 1-chlorobenzene-2,4-diisocyanate, 3-methyl diphenyl methane-4,4'-diisocyanate, 1-methyl cyclohexane-2,4-diisocyanate, 1-methyl cyclohexane-2,6-diisocyanate and the like. Any suitable uretdione such as 1,3-bis-[4'-methyl-3'-isocyanato-phenyl]-uretdione may be used.

It is also possible to use in addition to the organic diisocyanates, a minor proportion of organic monoisocyanates such as phenyl isocyanate, methyl isocyanate, benzyl isocyanate, butyl isocyanate, hexyl isocyanate and the like or polyisocyanates which have more than two —NCO groups per molecule such as, for example, p,p',p''-triphenylmethane triisocyanate or the like. Trifunctional isocyanates, such as the reaction products of trihydric alcohols and diisocyanates, or triisocyanates containing biuret groups can also be used. The isocyanates and their corresponding isothiocyanates may also contain ether, ester or carbodiimide groups.

The reaction products thereby obtained are eminently suitable as emulsifiers for the preparation of aqueous emulsions of hydrocarbon-substituted polysiloxanes which may be in the form of oils having molecular weights above 60,000 and accordingly viscosities above 10,000 centistokes at 20° C. or in the form of resins in the usual solvents for such resins. Compared with other emulsifiers, these emulsifiers are only slightly hydrophilic. In most cases where organopolysiloxane emulsions are used, namely as impregnations to impart a hydrophobic character, it is a considerable advantage, especially with regard to the durability of the impregnation, to be able to use an emulsifier which is only slightly hydrophilic.

The optimum quantity of the emulsifier to be used according to the invention depends upon each individual use. Additionally, it depends on the concentration of the emulsion and on the type of the polysiloxane, especially on whether it is a solution of resin or an oil. In all cases it is necessary to use at least so much that the emulsion when ready for use contains 10% of its weight of emulsifier.

Emulsification may be carried out by two different methods. The emulsifier may be first dispersed in water and the organopolysiloxane then emulsified in this dispersion. However, more stable emulsions may generally be obtained by first mixing the emulsifier with the organopolysiloxane to form a paste and then adding the water gradually with the aid of a simple stirring mechanism or simply by stirring by hand when the quantities are small.

The emulsions prepared in the manner above described are well suitable to all the processes in which aqueous organopolysiloxane emulsions are usually applied, especially to render water repellent or release properties to the surfaces of fibrous materials, glass, ceramics, building materials and the like.

The following examples are illustrative of the invention, parts being by weight unless otherwise specified.

EXAMPLE 1

About 2550 g. of a polyalkylene glycol monobutyl ether (OH number=44) obtained by copolymerisation of equimolar quantities of ethylene oxide and propylene oxide are thoroughly mixed with about 1.9 cc. of a solution consisting of equal parts by weight of $BF_3$ and tetrahydrofuran. About 400 g. of an epoxyorganooctasiloxane of the formula

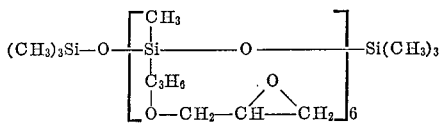

obtained in known manner and containing 21% by weight of epoxide groups ($C_2H_2O$, molecular weight 42) are then added, and the reaction mixture is heated for about 2.5 hours at 120° C. with stirring. A water soluble polyether siloxane which contains COH groups and in which no more epoxide groups can be detected analytically is thereby obtained.

About 150 g. of toluylene diisocyanate is then added at room temperature and begins to react after a few minutes accompanied by foaming and slow increase of viscosity of the mixture. After a reaction time of ½ hour at 20° C., 9.3 litres of water are added gradually while stirring, and about 3100 g. of $\alpha:\omega$-di-(trimethylsiloxy)-polydimethylsiloxane of viscosity 1000 centistokes at 20° C. are then dispersed with the aid of a conventional emulsifier apparatus in the resulting solution.

A viscous, stable aqueous emulsion containing about 20% by weight of siloxane oil is thereby obtained which can be used as a *hydrophobic* impregnant and as a *mold release* agent.

EXAMPLE 2

About 350 g. of the same polyalkylene glycol monobutyl ether as described in Example 1 are diluted with about 350 g. of toluene, the solution is mixed with about 0.26 cc. of a solution composed of equal parts by weight of $BF_3$ and tetrahydrofuran, and about 200 g. of an epoxyorganopolysiloxane of the formula

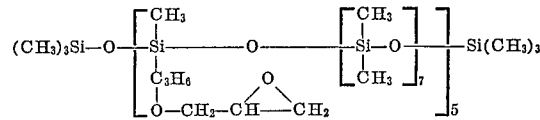

prepared in known manner and containing 5.6 percent by weight epoxide groups ($C_2H_2O$, molecular weight 42) are added.

This reaction mixture is then boiled for about 10 hours under reflux and the solvent is then distilled off. The polyether siloxane remaining behind is not water soluble. It is mixed at room temperature with 30 g. of toluylene diisocyanate and the mixture is then stirred for ½ hour.

About 500 g. of $\alpha:\omega$-di-(trimethylsiloxy)-polydimethylsiloxane of viscosity 100 centistokes (20° C.) are added to the resulting reaction product and thoroughly mixed. About 700 cc. of water are then gradually added with stirring to the paste obtained from this mixture, and a viscous, stable emulsion is thus prepared.

EXAMPLE 3

Three stable emulsions are prepared as follows: The quantity indicated in each case under the heading "A" in the following table and of the same polyalkylene glycol mono butyl ether as described in Example 1 is mixed with 0.2% of this quantity of the previously described $BF_3$-solution in tetrahydrofuran and with about 100 g. of an epoxyorganopentasiloxane of the formula

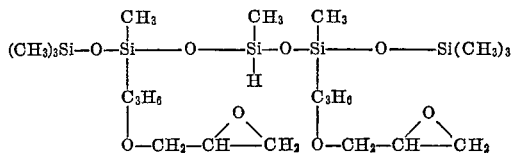

prepared in known manned and containing 15% by weight of epoxide groups ($C_2H_2O$, molecular weight 42). This mixture is reacted for 4 hours at 80° C. The quantity of toluylene diisocyanate indicated in each case under the heading "B" in the table is then added at 20° C. to the polyether siloxane formed, and after leaving the reaction mixture for ½ hour, the product so obtained is mixed with the quantity indicated under the heading "oil" in the table of α:ω-dihydroxypolydimethylsiloxane of viscosity 20,000 centistokes (20° C.). Water is then stirred into this mixture in the following quantities.

TABLE OF QUANTITIES

|     | A (g.) | B (g.) | Oil (g.) | Water (cm.³) |
|-----|--------|--------|----------|--------------|
| (a) | 500    | 30     | 600      | 1,200        |
| (b) | 150    | 25     | 250      | 500          |
| (c) | 66     | 15     | 150      | 250          |

EXAMPLE 4

Three further emulsions of good stability are obtained as follows: (a) 70 g. of polyethylene glycol monobutyl ether of molecular weight 325 (OH number=346), (b) 63 g. of polypropylene glycol monobutyl ether of molecular weight 325 (OH number=345), (c) 67 g. of polyalkylene glycol monobutyl ether obtained from equimolar quantities of ethylene oxide and propylene oxide and having a molecular weight of 200 (OH number=542) are mixed with 0.1 cc. of the BF$_3$-tetrahydrofuran solution described in the preceding examples and 100 g. of the same epoxyorganopentasiloxane as described in Example 3, and the mixture is reacted for about 3 hours at 80° C. About 5% by weight of toluylene diisocyanate are then added in each case to the resulting polyether siloxanes at room temperature, and the mixtures are reacted for about ½ hour at 20° C.

In case (a) an equal quantity and in cases (b) and (c) the double quantity by weight of α:ω-di-(trimethylsiloxy)-polydimethylsiloxane of viscosity 1000 centistokes (20° C.) are added to the emulsifiers so obtained and the substances are thoroughly mixed. In cases (a) and (b) double the quantity of water and in case (c) three times the quantity of water calculated on the quantity of emulsifier are then added with stirring to the three pastes.

EXAMPLE 5

Seven emulsions of good stability may be prepared as follows:

About 1000 g. of the same polyalkylene glycol monobutyl ether as described in Example 1 are mixed with about 1.9 cc. of the BF$_3$-tetrahydrofuran solution described there and 200 g. of the same epoxyorganopentasiloxane as described in Example 3, and the mixtures are left to react for about 3 hours at 80° C. One of the isocyanates given in the following table is then added in each case to about 100 g. of the polyether siloxane so obtained, and the mixtures are reacted for about ½ hour.

The quantity indicated in the table under the heading "Oil" of α:ω-di-(trimethylsiloxy)-polydimethylsiloxane of viscosity 1000 centistokes (20° C.) is then added to the emulsifiers so obtained, and water in the quantities given in the table is then added.

|                                                    | Oil (g.) | Water (cc.) |
|----------------------------------------------------|----------|-------------|
| (a) 1 g. of toluylene diisocyanate                 | 100      | 200         |
| (b) 5 g. of toluylene diisocyanate                 | 200      | 300         |
| (c) 10 g. of toluylene diisocyanate                | 200      | 500         |
| (d) 5 g. of hexamethylene diisocyanate             | 100      | 400         |
| (e) 5 g. of di-(4-isocyanatephenyl)-methane        | 100      | 200         |
| (f) 5 g. of di-(4-isocyanatephenyl)-dimethyl-methane | 100    | 200         |
| (g) 3 g. of tri-(4-isocyanatephenyl)-thionophosphate | 100    | 200         |

EXAMPLE 6

About 250 g. of the same polyalkylene glycol monobutyl ether as described in Example 1 are mixed with 0.19 cc. of the BF$_3$-tetrahydrofuran solution described there and with 46 g. of an epoxyorganodisiloxane of the formula

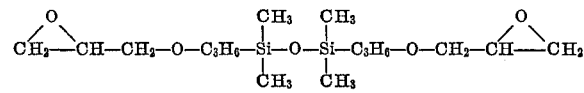

prepared in known manner. This reaction mixture is heated for about 4 hours at 90° C. About 20 g. of toluylene diisocyanate is added at 80° C. to the polyether siloxane so formed, and ½ hour later 200 g. of a solution of equal parts by weight of toluene and methyl polysiloxane resin of the composition $$(CH_3)_2SiO \cdot 9CH_3SiO_{3/2}$$

are added. After mixing to obtain a uniform mixture, 300 cc. of water are added while stirring, and a very stable emulsion is obtained.

EXAMPLE 7

About 125 g. of the same polyalkylene glycol monobutyl ether as described in Example 1 are mixed with about 0.75 cc. of the BF$_3$-tetrahydrofuran solution described there and with about 80 g. of an epoxyorganopolysiloxane of the formula

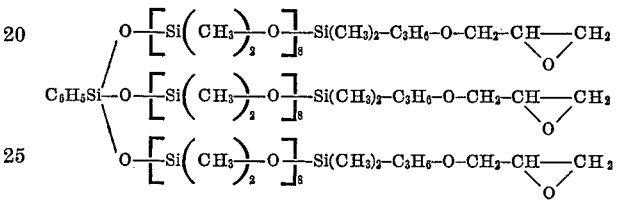

in known manner and containing 5 percent by weight of epoxide groups (C$_2$H$_2$O, molecular weight 42). This mixture is heated for 3 hours at 80° C., cooled to 20° C., mixed with about 20 g. of toluylene isocyanate and then ½ hour later with about 200 g. of the methylpolysiloxane resin solution described in Example 6 and finally with about 200 cc. water. A stable emulsion is obtained.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. An emulsifier for use in the preparation of stable aqueous organopolysiloxane emulsions comprising the reaction product of (a) a polyfunctional isocyanate with (b) a polyether siloxane of the formula

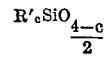

wherein $c$ is 1, 2 or 3, at least one of the radicals R′ having the formula

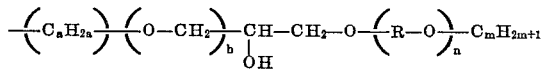

the remaining R′ radicals being selected from the group consisting of methyl and phenyl, $a$ and $m$ are integers of from 1 to 4 inclusive, $b$ is 0 or 1, and $-(R-O)_n$ signifying a polyether chain consisting of units selected from the group consisting of oxyalkylene and oxyarylene radicals having a value of $n$ such that the molecular weight of the polyether moiety $—O(R—O)_nC_mH_{2m+1}$ is from about 100 to about 10,000.

2. The emulsifier of claim 1 wherein the molar ratio of the isocyanato groups of the isocyanate to the hydroxyl groups of the polyether siloxane is from about 1:1 to 1:2.

3. An emulsifier according to claim 2, wherein hexamethylene diisocyanate is the isocyanate component of the reaction product.

4. An emulsifier according to claim 2, wherein toluylene diisocyanate is the isocyanate component of the reaction product.

5. An emulsifier according to claim 2, wherein di-(4-isocyanate-phenyl)-methane is the isocyanate component of the reaction product.

6. An emulsifier according to claim 2, wherein di-(4- isocyanatephenyl)-dimethylmethane is the isocyanate component of the reaction product.

7. An emulsifier according to claim 2, wherein dicyclohexyldiisocyanate is the isocyanate component of the reaction product.

8. An emulsifier according to claim 2, wherein tri-(4-isocyanatephenyl)-thionophosphate is the isocyanate component of the reaction product.

References Cited

UNITED STATES PATENTS

| | | | |
|---|---|---|---|
| 3,179,622 | 4/1965 | Haluska | 260—46.5 |
| 3,246,048 | 4/1966 | Haluska | 260—824 |

TOBIAS E. LEVOW, *Primary Examiner.*

J. PODGORSKI, *Assistant Examiner.*